US012792704B2

(12) United States Patent
Bouso et al.

(10) Patent No.: US 12,792,704 B2
(45) Date of Patent: Nov. 10, 2026

(54) GENERATIVE CONSTRUCTION OF DIGITAL USER IDENTITY AS VERIFIED BY PERSONALLY IDENTIFIABLE INFORMATION

(71) Applicant: Socure, Inc., Incline Village, NV (US)

(72) Inventors: Samer Bouso, Incline Village, NV (US); Pablo Ysrrael Abreu, Incline Village, NV (US); Arun Velmurugan, Incline Village, NV (US)

(73) Assignee: Socure, Inc., Incline Village, NV (US)

( * ) Notice: Subject to any disclaimer, the term of this patent is extended or adjusted under 35 U.S.C. 154(b) by 41 days.

(21) Appl. No.: 18/931,645

(22) Filed: Oct. 30, 2024

(65) Prior Publication Data

US 2026/0119624 A1 Apr. 30, 2026

(51) Int. Cl.
*G06F 21/31* (2013.01)

(52) U.S. Cl.
CPC .................................. *G06F 21/31* (2013.01)

(58) Field of Classification Search
CPC ...... G06F 21/31; G06F 21/316; H04W 12/02; G06N 20/00; H04L 67/306; H04L 67/535
See application file for complete search history.

(56) References Cited

U.S. PATENT DOCUMENTS 11,228,568 B1 * 1/2022 Dey ...................... H04W 12/02
11,455,641 B1 9/2022 Shahidzadeh et al.
2021/0110398 A1 * 4/2021 Okazaki ............. G06Q 20/4016
2022/0101161 A1 3/2022 Goel et al.
2022/0182379 A1 * 6/2022 Budman ................. G06F 3/011
2023/0090108 A1 * 3/2023 Ciabarra, Jr. ....... G06F 21/6254 726/26
2023/0409738 A1 * 12/2023 Hayden ............... G06F 21/6245

FOREIGN PATENT DOCUMENTS

CA 3042541 A1 11/2019

OTHER PUBLICATIONS

European Search Report and Written Opinion issued in application No. EP 25184063 dated Aug. 29, 2025.

* cited by examiner

*Primary Examiner* — Amie C. Lin

(74) *Attorney, Agent, or Firm* — Charles B. Lobsenz; Brian H. Buck; Potomac Law Group, PLLC

(57) ABSTRACT

Provided are a method and system for digital user identification in use of corresponding personally identifiable information (PII) as an instrument of verifying the identification. For one or more iterations of execution of the method and system, aggregated user data obtained by a server and corresponding to a digital user defines a digital profile confirmed for PII transacted at the time of the aggregation. Accordingly, and when one or more components of the profile are inspected for deviation thereof relative to the profile, as confirmed, legitimacy of the digital user identification is determined.

14 Claims, 3 Drawing Sheets

GENERATIVE CONSTRUCTION OF DIGITAL USER IDENTITY AS VERIFIED BY PERSONALLY IDENTIFIABLE INFORMATION

FIELD OF THE DISCLOSURE

Disclosed embodiments relate to digital identity generation, and more specifically, to such generation employing contextual inspection for user digital activity linked to personally identifiable information (PII) of the user corresponding to one or more digital activities.

BACKGROUND

Digital activity of a user, whether when surfing the internet, interacting with a particular website to browse product or other information, or engaging with a website for one or more dedicated transactions (e.g., education, banking, contractual endeavor) is recognized as a means by which to gather information about the user and the user's device during the activity. Such gathered information, as is understood, can be compiled to produce a user identity. This is particularly the case when the user is either unaware of or accepts the use of cookies that track information during a web browser session.

In recent years, however, regulatory regimes such as the General Data Protection Regulation in the European Union and the California Consumer Privacy Action in the United States impinge on the unfettered collection, use, and storage of cookies. For instance, such regimes require permission for cookie use and disclosure of manner of that use if acceptance is provided. Accordingly, browser implementations seeking to comply with these exemplary regimes must offer users the opportunity to tailor their browsing experience.

Because of this, and particularly in the case of third-party cookies (i.e., cookies linked to ads provided on a website), it can become difficult to obtain a device-user association when that user corresponds to multiple devices which she may use to browse multiple websites. Such an association may be further hampered due to the increasing complexity of operating systems that enable malevolent actors to delete one or more portions of device identifiers.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system regarding determining a digital profile of an entity, including receiving data corresponding to the entity, the data being associated with a digital device of the entity and use thereof, by the entity, during operation of the digital device for a transaction, aggregating the received data into specified types thereof, forming aggregated data, and for one or more iterations of the aggregating forming the aggregated data, receiving personally identifiable information (PII) corresponding to the entity. The method and system may further include inspecting the aggregated data to determine correlation between the aggregated data and the PII, wherein the inspecting comprises applying machine learning to the aggregated data, for the correlation to the PII, to determine a deviation of the aggregated data. The method and system may still further include, based on the determined deviation of the aggregated data, resolving the digital profile of the entity, and generating an identification (ID) candidacy of the entity via weighting the ID candidacy by an amount of the deviation. In these regards, the method and system may include determining the digital profile as legitimate for the entity according to the ID candidacy at least meeting a predetermined threshold.

DETAILED DESCRIPTION

Figure 1:
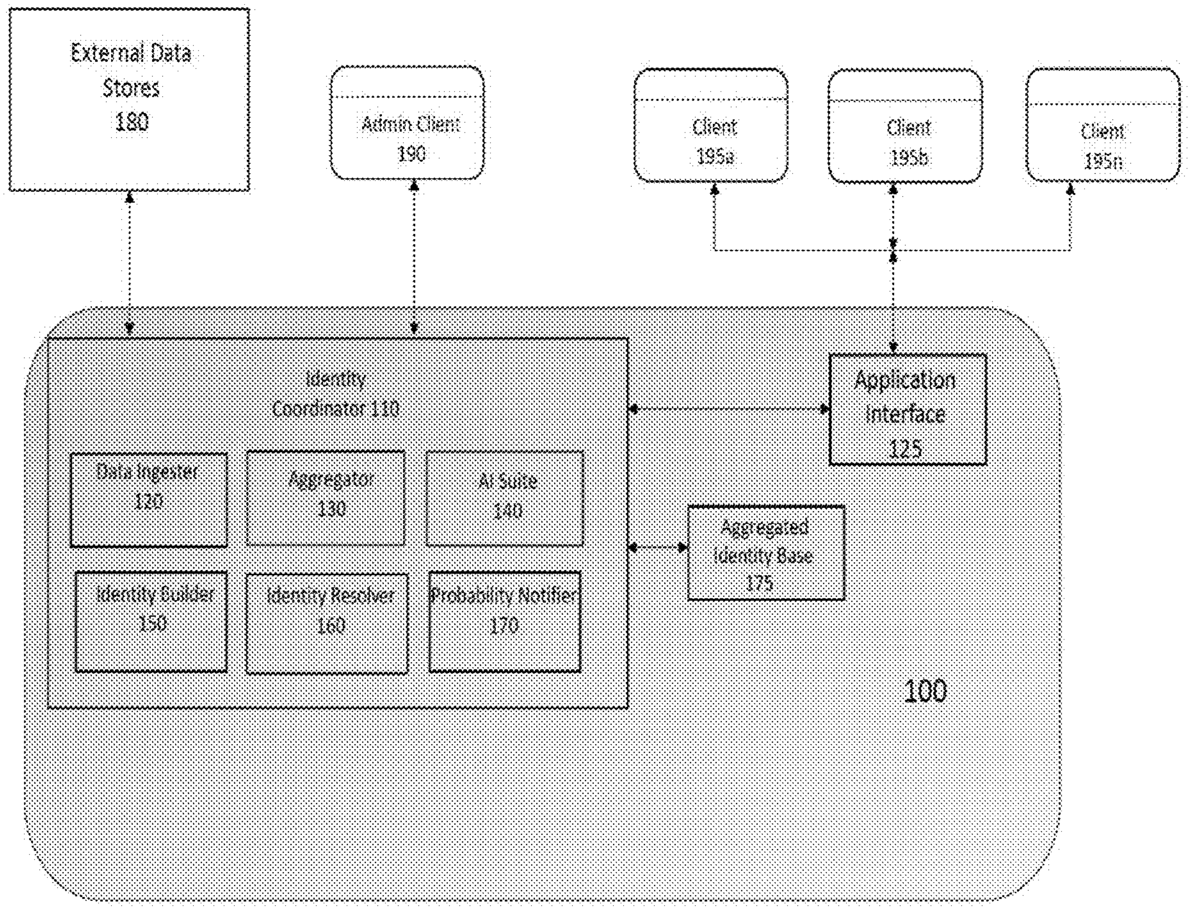
FIG. 1 illustrates elements of a Digital Profile System (DPS) enabling inspection of user digital activity for verification against personally identifiable information (PII), according to embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Herein, the terms "transaction," and "transaction request" can mean any event for which identity can be detected via analysis and scoring of information used in connection with the event, and include, for example, an application for a business or other type of account opening, an application providing an account information update, an application for a credit check, any type of application for a background check or identity verification, an application for an employment check or verification, etc. That is, the subject information for which identity may be detected can be information submitted during an initial stage (i.e., application stage) of an activity toward which an application is directed (e.g., account opening, employment, etc.).

Aspects of the present disclosure are directed to determining, for a user of a digital device, a digital identity or "profile" corresponding to certain collected aggregations of user data caused while the device is in use during a transaction. During such use, one or more instances of personally identifiable information (PII) of the user (e.g., name, DOB, social security number, email address, phone number, gender, ethnicity, etc.) may also be collected, such that, for one or more iterations of embodiments as are discussed herein, the determined digital identity may be verified by and/or for the PII. In these regards, the aforementioned collections of user data may be obtained in real-time and anonymized so as to respect privacy safeguards prevalent in the digital community. Further, the collection of PII may be undertaken with user consent. Accordingly, and as will be understood from discussion hereinbelow, embodiments herein may establish a framework to confirm or deny the veracity of a digital identity, and correspondingly, the identity of a natural user attempting use of that digital identity. Furthermore, it is submitted that such an understanding will reveal to the reader that such embodiments, when implemented at a server in receipt of the collected user data and PII, readily bypass the shortcomings of client-side or browser impediments on identity analysis.

Referring to FIG. 1, there is illustrated a Digital Profile System (DPS) 100 according to one or more embodiments herein. DPS 100 may reside on a single cloud based server, although it is also possible for various components of DPS 100 (as described herein) to reside on separate servers. By way of example, DPS 100 may be a computer implemented application which resides on a computing server. As will be apparent from the discussion herein, WCS 100 may include and/or implement all appropriate software (e.g., algorithms) and/or hardware (i.e., storage, processors) for carrying out its applicable identity correlation and related capabilities.

DPS 100 preferably includes Identity Coordinator (IC) 110, which itself is comprised of a number of modules as discussed further herein. IC 110 operates to detect digital user data and PII corresponding to, for example, one or more transactions carried out in a digital context such as may be the case when the user engages a website for the conveyance of the user's data. These detections may be generated in response to requests, for the detections, that originate from clients 195*a*, 195*b* . . . 195*n*. DPS 100 may be accessed through the internet or any other private or public network by one or more clients 195.

Each of clients 195 may be personal computers, laptops, handheld computing devices such as smartphones or tablets or any other device capable of providing the required connectivity and display. In some embodiments, a client 195 may be a computing application operated by a customer subscribed to DPS 100, and which requires identity correlation data to process transaction requests. For example, client 195 may be an application or set of applications operated by a financial institution which processes requests for new credit cards made by customers of that financial institution. As is mentioned above, the terms "transaction," and "transaction request" can mean any event for which identity can be detected via analysis and scoring of information used in connection with the event, and include, for example, an application for a business or other type of account opening, an application providing an account information update, an application for a credit check, any type of application for a background check or identity verification, an application for an employment check or verification, etc. That is, the subject information for which identity may be detected can be information submitted during an initial stage (i.e., application stage) of an activity toward which an application is directed (e.g., account opening, employment, etc.). In these regards, for instance, it is contemplated that embodiments herein may be employed to detect correlation of a user's digital identity to that of PII submitted in connection with a transaction request. For example, it is contemplated that embodiments herein can execute the correlation in real-time in connection with any part of any of the aforementioned applications such that the activity toward which an application is directed (e.g., an account opening) ought not to proceed.

Clients 195 interact with DPS 100 such that data may be communicated between them via application interface 125 and such that DPS 100 may process identity correlation requests made by clients 195 with regard to one or more of the above types of applications made by entities, such as individuals or organizations. Application interface 125 may comprise one or more application programming interfaces (APIs) that permit and coordinate communications and/or operations between applications associated with clients 195 and one or more components of DPS 100 as are discussed herein.

Also shown in FIG. 1 is admin client 190. Admin client 190 may comprise one or more of personal computers, laptops, handheld computing devices such as smartphones or tablets or any other similar device(s). Admin client 190 is operative to allow operators of DPS 100 to configure, maintain and support the operation of DPS 100. For example, an operator may use admin client 190 to interact with DPS 100 to set parameters regarding what is required to invoke one or more correlations between digital user data and PII as discussed in further detail below.

External data stores 180 may also be present according to the teachings of one or more embodiments herein. External data stores 180 may comprise one or more external databases, data sets, systems, applications, rules bases and/or other sources of data which are used by DPS 100 to generate identity correlations as further described herein. By way of example, external data stores 180 may comprise credit reporting databases, public and/or private demographic databases, reported and known fraud data, financial transaction data, social media data, public licensing databases as well as other sources of data useful to DPS 100 in generating identity correlation.

Returning now to the specific components of DPS 100, DPS 100 may include various components for correlating digital user data to PII. In these regards, it will be understood from the discussion below that correlation of the digital user data to PII may encompass various types of aggregated user data discussed specifically with reference to FIG. 2.

DPS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to DPS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from clients 195, and/or other information that enables the servers to function as described herein.

While an exemplary architecture is described above, it will readily be understood by one of skill in the art, that an unlimited number of architectures and computing environments are possible while still remaining within the scope and spirit of the present embodiments.

Returning now to the specific components of DPS 100 shown in FIG. 1, IC 110 includes various components which are described hereinbelow. Operation(s) of each of these IC 110 components will be described in further detail below with reference to FIG. 3.

In one or more embodiments, IC 110 can include a data ingestor 120, an aggregator 130, and artificial intelligence (AI) suite 140, an identity builder 150, an identity resolver 160, and a probability notifier 170. One or more of these components can, via operation of the DPS 100, interact with an aggregated identity base 175 for purposes described hereinbelow.

More particularly, data ingestor 120 can interact with external data stores 180 to retrieve, in real-time, data compiled for known identities, including digital user data correlated to PII and which is available in the public sphere. Still more, data ingestor 120 can, according to embodiments herein, obtain such aforementioned correlations during operation of DPS 100 whenever IC 110 resolves correlation between digital user data and PII (such as may be received from a client 195*n*).

In response to a user engaging in one or more transaction opportunities offered by a client 195*n*, aggregator 130 operates to receive (a), via a software development kit (SDK) at the client 195*n*, the collection and sorting of certain types of digital user data (see FIG. 2), as well as (b) PII for that user corresponding to the time of entry of such PII data for the transaction.

AI suite 140 may comprise one or more algorithms and/or machine learning (ML) models which may, during the course of operation of DPS 100 for one or more iterations of client 195*n* calls to DPS 100, determine a multitude of sizing of (i.e., amount), selection of (i.e., one or more sets of), and grading of importance of digital user data that may impact correlation to PII. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CNN), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

Identity builder 150 can be configured to include an API, of API 125, that, according to and resulting from operation of one or more of data ingestor 120, aggregator 130, and AI suite 140, causes the correlation and comparison of digital user data to PII for one or more transactions for which a client 195*n* call was made to DPS 100. As will be appreciated from the discussion below, receipt by the aforementioned included API of a call from a subscriber of DPS 100 readily transforms dedicated operations of a server, constituting DPS 100, from that of dedicated monitoring of continuously received data (e.g., as from external data stores 180) to those of concurrent correlation and comparison for data provided by and associable with that call. That is, the call acts as a trigger for this additional, concurrent operation of that DPS 100 server, such that the server is transformed into a particular machine as pertains to the call, while still maintaining its dedicated, continual monitoring functionality for received data.

Identity resolver 160, as a result of the correlation obtained by identity builder 150, can create a digital profile for the correlation and store the same in or more of storage of DPS 100.

Given possession of this digital profile, probability notifier 170 can, in conjunction with and in communication with one or more portions of AI suite 140, determine a probability that, for one or more iterations of ingested digital user data and PII, that the individual for whom the ingestion occurred is or is not legitimate with respect to the above-discussed transaction. More specifically, notifier 170 can assess using, for instance, identities available from aggregated identity base 175, whether digital user data known to correlate to PII of the individual is representative for the current transaction. For instance, the probability can be forwarded to an operator of client 195*n* as a percentage of risk for the legitimacy, wherein a lower percentage magnitude indicates legitimacy of identity, and a higher percentage magnitude (>50%) represents misrepresentation.

Figure 2:
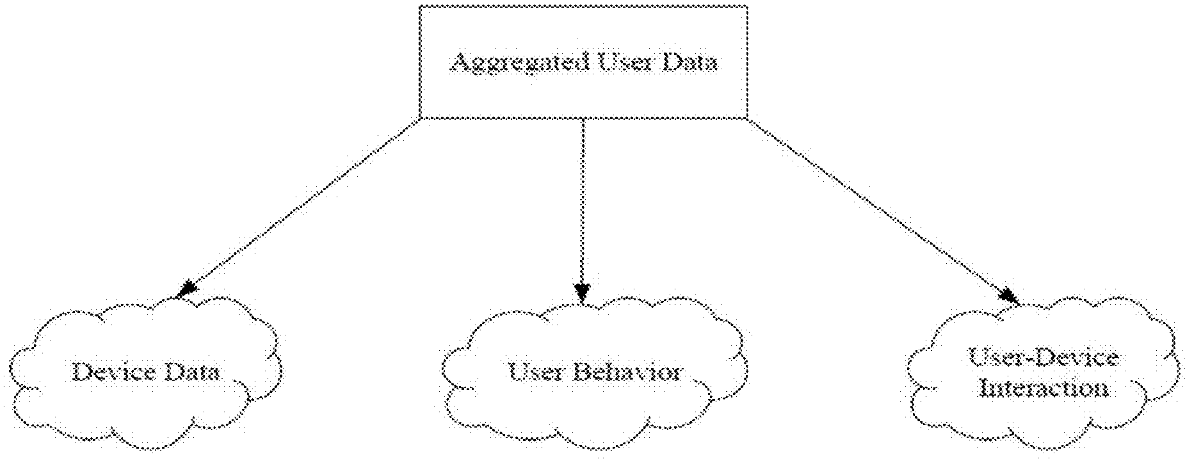
FIG. 2 illustrates various forms of aggregated user data included in the inspection of FIG. 1, according to embodiments herein.

In referring to FIG. 2, there is shown the various specific types of digital user data that may be aggregated by, for example, aggregator 130 of FIG. 1, as aggregated user data (AUD) when evaluating correlation to PII for the purpose of determining legitimacy of an individual or other entity engaging in a transaction as described above; as such, AUD may be interchangeable with the term, aggregated entity data (AED).

As is shown, the AUD may include device data or data specific to the digital hardware device a user implements for a transaction. Additionally, the AUD may include user behavior data, i.e., data representing how such a user engages a particular website or how that user travels across websites. Still further, the AUD may include user-device interaction data indicative of particularized contact(s) with a digital device used by the user at the time of engaging in a transaction.

More specifically, the aforementioned device data may include one or more of device/browser settings (i.e., screen resolution, time zone settings, language preferences, cookie settings, and local storage capacity); device hardware description (i.e., make, model, operating system, battery status, CPU architecture, and sensor (e.g., accelerometer, gyroscope) availability); current software information (e.g., operating system, browser, plugins and/or applications); network internet service provider and connection characteristics (i.e., IP address, LAN IP address, connection type, such as WiFi or 5G); and aspects regarding geolocation, including GPS data, internet protocol location, and cellular network data.

With respect to AUD comprising user behavior data, the same can include one or more of the following: interaction patterns descriptive of how a user interacts with a particular interface in terms of, at least, click patterns, swiping behavior, and scroll speed; usage frequency and duration with respect to travel to and pendency on one or more applications or websites; navigation paths (i.e., one or more sequences of actions or pages visited within an application or website); and typing patterns descriptive of speed and/or duration to complete form field entry within an application or website.

User-device interaction data that may, according to one or more embodiments herein, form the discussed AUD can include certain biometric data for the user of a digital device implemented for a transaction as is discussed herein. In particular, such data may encompass keystroke dynamics characterizing a timing and pressure for keystrokes when entries are made using the device; touch dynamics detailing one or more pressure, speed and angle of touch on a touchscreen; and aspects for mouse movement detailing criteria such as speed, acceleration, and pattern.

Having described the above AUD, it is to be understood that such AUD may encompass one or more of the discussed device data, user behavior data, and user-device interaction data to include, depending on availability for collection by DPS 100, one or more of the specifically described types of those data. Moreover, it is contemplated that the specifically described types of those data are merely exemplary, such that other types of data may be manifest or otherwise deducible from the data.

Figure 3:
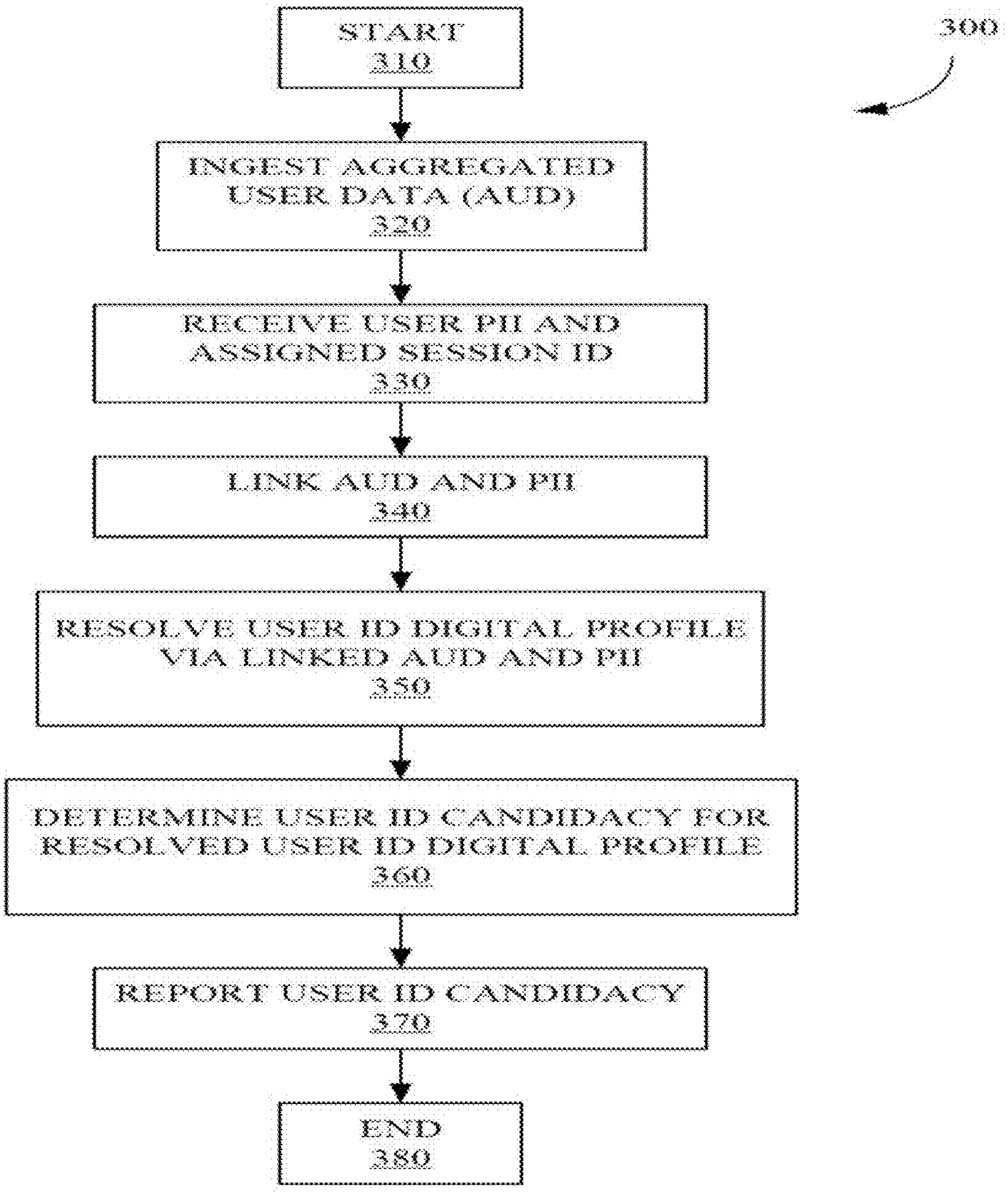
FIG. 3 illustrates a flow diagram of a process for conducting the inspection of user digital activity for verification against PII of FIG. 1, according to embodiments herein.

Referring to FIG. 3, there is illustrated a process 300 for conducting, by DPS 100, inspection of user digital activity for verification against PII when an individual, for a transaction as discussed herein, attempts that transaction. The inspection results in generation of a digital profile for the individual which can indicate whether, with respect to the device being used for the transaction, the identity of the individual is legitimate.

The process 300 can begin at 310 and be implemented whenever an individual user ("user") engages a client 195*n*

(see FIG. 1) to partake in a transaction for which submission of PII of the user is required. In this regard, the client 195*n* may implement an SDK (developed by an operator of DPS 100) configured to, at 320, ingest, i.e., collect, store and sort, AUD as is discussed in connection with FIG. 2, and send that AUD to an operator of DPS 100, and more specifically, an implemented server of and/or comprising DPS 100. In this regard, the collected AUD may, for example, include device data of the user, user behavior before and after navigating to the website/application for the transaction, and/or user-device interaction data during user engagement for the transaction. Relative to the instance in which the SDK is configured by such operator for a subscriber to DPS 100, a session ID can be assigned to the aforementioned ingestion given dedication of the website/application necessary to implement the transaction. Accordingly, and at 330, process 300 can be configured such that the operator of DPS 100 can receive (e.g., as a result of the API call from a subscriber of DPS 100) PII corresponding to the user for the transaction and the assigned session ID. As a result, and with respect to one or more iterations of operation of DPS 100, identity builder 150 (see FIG. 1) can, via the assigned session ID, correlate (i.e., link) the ingested AUD and the received PII, as at 340. Using this correlation/linkage, process 300 can analyze the same to detect the degree or extent to which the AUD is linked to the PII, and thus whether the individual purporting to be associated with the AUD is legitimate. In this regard, process 300 can inspect, using prior AUD/PII correlations and digital profiles stored in aggregated identity base 175 and/or such correlations as are available in the public sphere as provided from external data stores 180, to ascertain the aforementioned degree or extent of AUD/PII linkage. In conducting the analysis, process 300 can, for example, implement one or more machine learning models and/or algorithms of AI suite 140 (see FIG. 1).

For the implementation, process 300 can convert one or more instances of the correlated AUD into ML model input, such as in values for a sparse vector which the ML model is trained to receive. Here, the model can be trained with supervised learning and use training data that can be obtained from a history of obtained AUD (such as from external data stores 180 in FIG. 1). More specifically, each item of the training data can include an instance of a prior item of AUD matched to one or more determinations of an identity of an individual. The matching can be performed according to a predetermined algorithm configured to receive AUD and pair it with PII for an identity. For example, prior AUD can indicate legitimacy for the identity. During the model training, a representation of the AUD (e.g. values representing the same) can be provided to the model (e.g., each as an element of a vector). Then, output from the model, i.e., deviation of AUD relative to PII for the identity, can be compared to the actual matched AUD to PII pairing and, based on the comparison, the model can be modified, such as by changing weights between nodes of the neural network or parameters of the functions used at each node in the neural network (e.g., applying a loss function). Herein, the term "deviation" can mean an amount by which one or more elements of AUD fail to correlate or link to one or more elements of PII. For instance, deviation may be measured for whether one or more elements of device data comprising an IP address corresponds completely or incompletely to PII of an identity of user extracted from external data stores 180 and/or aggregated identity base 175. As an example, the measurement can assess whether all or some identifiers for an IP address correspond to such PII. After applying each of the pairings of the inputs (AUD) and the desired outputs (AUD deviation) in the training data and modifying the model in this manner, the model is trained to evaluate new instances of AUD purported to correspond to reported PII in order to determine legitimacy of an identity.

Using the output of the aforementioned one or more ML models and/or algorithms, process 300 can, at 350, resolve a digital profile (i.e., AUD linked to PII) for the user, and relevant deviation, via the received AUD and PII according to, for instance, identity resolver 160 (FIG. 1) and its acknowledgement of the correspondence between the assigned session ID and the PII. That is, process 300 can, as at 360, determine a user ID candidacy for the resolved user ID digital profile. In one or more embodiments, the candidacy can be weighted according to an amount of deviation determined at 350, such that the candidacy can indicate a legitimate identity for a digital device user (i.e., a legitimate digital profile of the digital device user) should, for instance, the deviation comprise a magnitude meeting a threshold of, for example, less than 50%, or other predetermined percentage.

At 370, and prior to operations ending at 380, process 300 can report the user ID candidacy to a subscriber of DPS 100. As part of the reporting, DPS 100 can, in some implementations, receive feedback as to whether the candidacy is believed to be correct based on, for example, the subscriber's own knowledge of the user. Should, for instance, the feedback contravene the reported DPS 100 candidacy, DPS 100 can evaluate the feedback according to predetermined cleansing and/or clustering to determine whether the feedback can be trusted sufficiently to warrant updating of the aforementioned modeling. If the feedback warrants the updating according to the aforementioned cleansing and/or clustering, DPS 100 can then automatedly implement a revised version of the modeling accounting for the feedback. For example, labels pointing out the same type of prediction error may be grouped together. Such grouping assists in identifying any existing systematic gaps in the modeling performed according to the DPS 100. Relative to clustering for identity data, see commonly owned U.S. Pat. No. 10,956,916, entitled, "Self Learning Machine Learning Pipeline for Enabling Identity Verification," issued on Mar. 23, 2021, which is incorporated by reference herein in its entirety. As is relevant herein, clustering can be performed using algorithms such as K-means, hierarchical clustering, etc. Useful dimensions to cluster on may include type of error, data subsets, model confidence, prediction similarity, etc. Feedback labels that do not fit well into any cluster may be set aside for manual review, the outcome of which may result in updating of modeling performed by the DPS 100. In this regard, a human may examine outliers to understand if any common themes exist. Outliers may indicate unusual model failures or rare data subsets. If new types of systematic errors are identified, new clusters can be formed. Otherwise, the outlier labels remain unclustered and still remain valuable as individual feedback. As will be appreciated, the clusters and outliers provide insight into model limitations that can drive iterative feature engineering to address gaps in model design. For example, such engineering may include adding features to better detect subgroups of data for which model performance was not optimal. The improved model is then deployed, generating opportunity for new feedback, and the loop continues. In one or more instances, the model may be updated, automatedly or otherwise via manual programming, in various respects (e.g., model parameters such as assigned weightings); if not, model parameters (such as assigned weightings) are maintained.

Thus, as can be appreciated from the above discussion, one or more of the presently disclosed embodiments can be implemented to generatively construct a digital profile of a user of a digital device. Relative to that profile, received PII for the user can serve as an instrument by which the profile is or is not confirmed according to an expected association with the PII, thereby leading to a determination as to whether the user of the device is legitimate (i.e., fraudulent) for the contextual engagement in a transaction or transactions for which the device was interacted. A non-exhaustive listing of such transactions can include an account opening, an account login, a purchase, an identity verification procedure, etc. In these contexts, it can be understood that such a profile can inform a larger identity graphing for legitimacy of identity of a user attempting a transaction. For example, one or more components constituting the profile can be set alongside, compared to, and/or used in conjunction with data and determinations obtained according to, for example, "Know Your Customer" regimes as are discussed in previously incorporated U.S. Pat. No. 10,956,916, entitled, "Self Learning Machine Learning Pipeline for Enabling Identity Verification," and/or data and determinations obtained according to, for example, document analysis and verification as is discussed in commonly owned U.S. Patent Application Publication No. 2023/0230088, entitled, "Method and System of Predictive Document Verification and Machine Learning Therefor," and/or data and determinations obtained according to identity feature generation as is discussed in commonly owned U.S. Patent Application Publication No. 2023/0376962, entitled, "System and Method for Automated Feature Generation and Usage in Identity Decision Making," the entireties of such publications being incorporated herein by reference. In these ways, the presently disclosed embodiments, when taken alone or in combination with the techniques provided by the aforementioned incorporated documents, can provide segmented and/or complementary forensics as to legitimacy of identity that can, as will be understood, be arranged as one or more complete identity assessments that contribute to facilitating orderly flow of streams of commerce and data administration for identity. In particular, such assessments can, through use of real-time continual tracking and evaluation of identity patterning (e.g., PII usage and/or device association), determine, in real-time, legitimacy of identity. Throughout, processing for the determinations can be self-enriching, such that one or more employed machine learning modeling regimes can automatedly (a) recognize and adjust for discrepancy (e.g., such as in weighting for linkage between one or more elements of AUD and one or more elements of PII) relative to known user data and received data for a transaction and/or (b) adjust output according to received, external analysis of feedback corresponding to a determined user ID candidacy. As such, embodiments herein, when taken alone or in combination with aspects as are discussed in the above-incorporated documents, can be used to accomplish the aforementioned identity graphing for a user attempting a transaction to thus provide a proactive solution against misrepresentation of identity. As will be appreciated, such a graphing can be particularly instrumental to safeguarding legitimacy of identity with respect to all segments of the population who engage in transactions, including certain various hard-to-identify groups such as "thin-file" consumers and those initiating residence and/or other relation to a new geographical region.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A method of determining a digital profile of an entity, comprising:

at a server, performing each of:

ingesting data at the server from a digital device remotely disposed from the server and corresponding to the entity, the data being associated with the digital device and use thereof, by the entity, during operation of the digital device for a transaction;

aggregating the ingested data into specified types thereof, forming aggregated data;

for one or more iterations of the aggregating forming the aggregated data, receiving personally identifiable information (PII) corresponding to the entity;

inspecting the aggregated data to determine correlation between the aggregated data and the PII, wherein the inspecting comprises applying machine learning to the aggregated data, for the correlation to the PII, to determine a deviation between the aggregated data and the PII;

based on the determined deviation, resolving the digital profile of the entity;

generating an identification (ID) candidacy of the entity via weighting the ID candidacy by an amount of the deviation; and determining the digital profile as legitimate for the entity according to the ID candidacy at least meeting a predetermined threshold, the server (a) continuously receiving data being sourced from one or more databases disposed externally from the server and comprising one or more of first digital user data correlated to first corresponding user PII, and (b) in response to at least the aggregating the ingested data being performed, one or more portions of the server are transformed to execute the inspecting the aggregated data, based at least on the one or more of first digital user data correlated to first corresponding user PII, to determine the correlation between the aggregated data and the PII as the server continues to continuously receive the data sourced externally from the one or more databases.

2. The method of claim 1, wherein:

the aggregated data comprises one or more of (a) device data for the digital device, (b) entity behavior for use of the digital device, (c) entity-device interaction data for the digital device, or (d) any combination thereof.

3. The method of claim 2, wherein:

in response to the aggregated data comprising (a), the aggregated data comprises one or more of (e) device/browser settings, (f) device hardware description, (g) current software information, (h) network internet service provider and connection characteristics, (i) geolocation, or (j) any combination thereof.

4. The method of claim 2, wherein:

in response to the aggregated data comprising (b), the aggregated data comprises (k) interaction patterns with the digital device, (l) usage frequency and duration regarding one or more applications or websites, (m) navigation paths regarding an application or website, (n) typing patterns within an application or website, or (o) any combination thereof.

5. The method of claim 2, wherein:

in response to the aggregated data comprising (c), the aggregated data comprises (p) keystroke dynamics, (q) touch dynamics, (r) mouse movement criteria, or(s) any combination thereof.

6. The method of claim 1, wherein:

the aggregated data corresponds to a browser session identification (ID) assigned at one or more portions of the server.

7. The method of claim 6, wherein:

the resolving the digital profile of the entity is further based on correspondence between the browser session ID and the received PII.

8. In a server determining a digital profile, the server comprising:

one or more processors; and one or more memories storing instructions that, when executed by the one or more processors, cause the server to perform a process comprising:

ingesting data at the server from a digital device remotely disposed from the server and corresponding to the entity, the data being associated with the digital device and use thereof, by the entity, during operation of the digital device for a transaction;

aggregating the ingested data into specified types thereof, forming aggregated data;

for one or more iterations of the aggregating forming the aggregated data, receiving personally identifiable information (PII) corresponding to the entity;

inspecting the aggregated data to determine correlation between the aggregated data and the PII, wherein the inspecting comprises applying machine learning to the aggregated data, for the correlation to the PII, to determine a deviation between the aggregated data and the PII;

based on the determined deviation, resolving the digital profile of the entity;

generating an identification (ID) candidacy of the entity via weighting the ID candidacy by an amount of the deviation; and determining the digital profile as legitimate for the entity according to the ID candidacy at least meeting a predetermined threshold, the server (a) continuously receiving data being sourced from one or more databases disposed externally from the server and comprising one or more of first digital user data correlated to first corresponding user PII, and (b) in response to at least the aggregating the ingested data being performed, one or more portions of the server are Transformed to execute the inspecting the as gated data, based at least on the one or more of first digital user data correlated to first corresponding user PII, to determine the correlation between the aggregated data and the PII as the server continues to continuously receive the data sourced externally from the one or more databases.

9. The server of claim 8, wherein:

the aggregated data comprises one or more of (a) device data for the digital device, (b) entity behavior for use of the digital device, (c) entity-device interaction data for the digital device, or (d) any combination thereof.

10. The server of claim 9, wherein:

in response to the aggregated data comprising (a), the aggregated data comprises one or more of (e) device/browser settings, (f) device hardware description, (g) current software information, (h) network internet service provider and connection characteristics, (i) geolocation, or (j) any combination thereof.

11. The server of claim 9, wherein:

in response to the aggregated data comprising (b), the aggregated data comprises (k) interaction patterns with the digital device, (l) usage frequency and duration regarding one or more applications or websites, (m) navigation paths regarding an application or website, (n) typing patterns within an application or website, or (o) any combination thereof.

12. The server of claim 9, wherein:

in response to the aggregated data comprising (c), the aggregated data comprises (p) keystroke dynamics, (q) touch dynamics, (r) mouse movement criteria, or(s) any combination thereof.

13. The server of claim 8, wherein:

the aggregated data corresponds to a browser session identification (ID) assigned at one or more portions of the server.

14. The server of claim 13, wherein:

the resolving the digital profile of the entity is further based on correspondence between the browser session ID and the received PII.

* * * * *